United States Patent [19]
Schubert

[11] 4,392,831
[45] Jul. 12, 1983

[54] ORRERY

[76] Inventor: Fritz Schubert, 1144 Trevor Dr., Lakeview Heights, Kelowna, British Columbia, Canada, V1Z 2J8

[21] Appl. No.: 301,781

[22] Filed: Sep. 14, 1981

[51] Int. Cl.³ ............................................. G09B 27/02
[52] U.S. Cl. ..................................................... 434/291
[58] Field of Search ............... 434/291, 292, 293, 294; 285/361, 396; 368/15, 16, 17, 18, 238

[56] References Cited

U.S. PATENT DOCUMENTS

| | | | |
|---|---|---|---|
| 72,612 | 12/1867 | Davis | 434/291 |
| 446,022 | 2/1891 | Shera | 434/293 |
| 727,858 | 5/1903 | Stier | 285/396 X |
| 749,508 | 1/1904 | Wesson | 434/291 |
| 831,231 | 9/1906 | Lindberg | 434/291 |
| 1,679,709 | 8/1928 | Cooper | 285/361 X |
| 1,811,825 | 6/1931 | Neevel | 434/291 |
| 2,098,296 | 11/1937 | La Grasse | 434/291 |
| 2,226,032 | 12/1940 | Wahlberg | 434/291 |
| 3,005,270 | 10/1961 | Musser | 434/291 |
| 3,029,528 | 4/1962 | Verson | 434/291 |
| 3,242,595 | 3/1966 | Eastman | 434/291 |
| 3,766,727 | 10/1973 | Didik | 434/294 X |

Primary Examiner—William H. Grieb
Attorney, Agent, or Firm—Townsend and Townsend

[57] ABSTRACT

An orrery for displaying planetary representations is provided. The orrery has a frame and a plurality of concentric hollow tubes rotatably mounted on the frame. First and second ends of each of the tubes extend axially beyond first and second ends respectively of the outwardly adjacent tube. A plurality of supports are provided each for connecting at an inner end thereof to the first end of one of the tubes so as to extend radially outward from it. Each of a plurality of bayonnet plug and socket means removably connect the inner end of one of the support means to the first end of one of the tubes. Planetary body representations are each connected to a position on one of the supports remote from the tube to which that support is connected. A drive mechanism connected to a second end of each of the tubes rotates each of the tubes.

7 Claims, 9 Drawing Figures

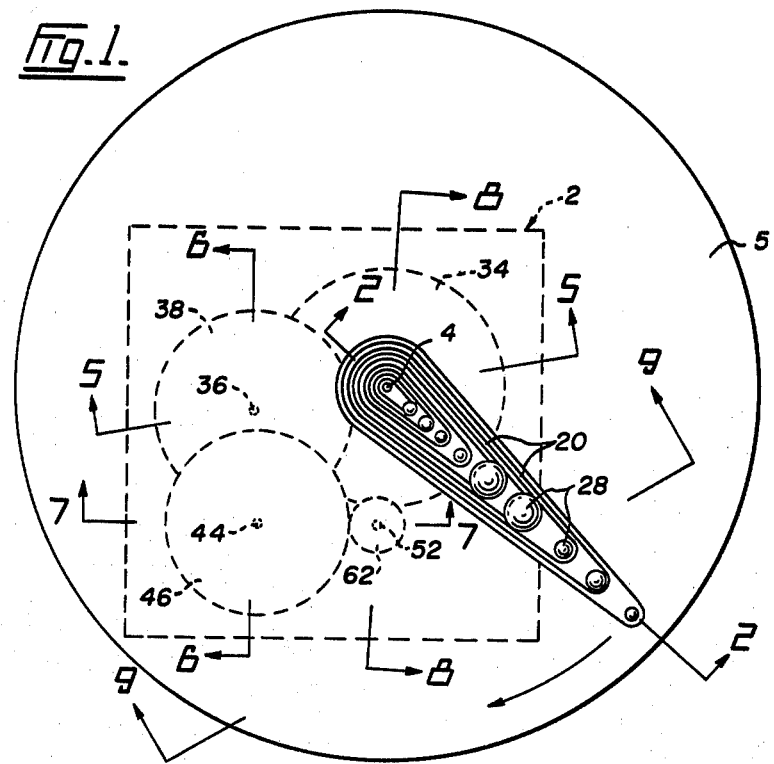
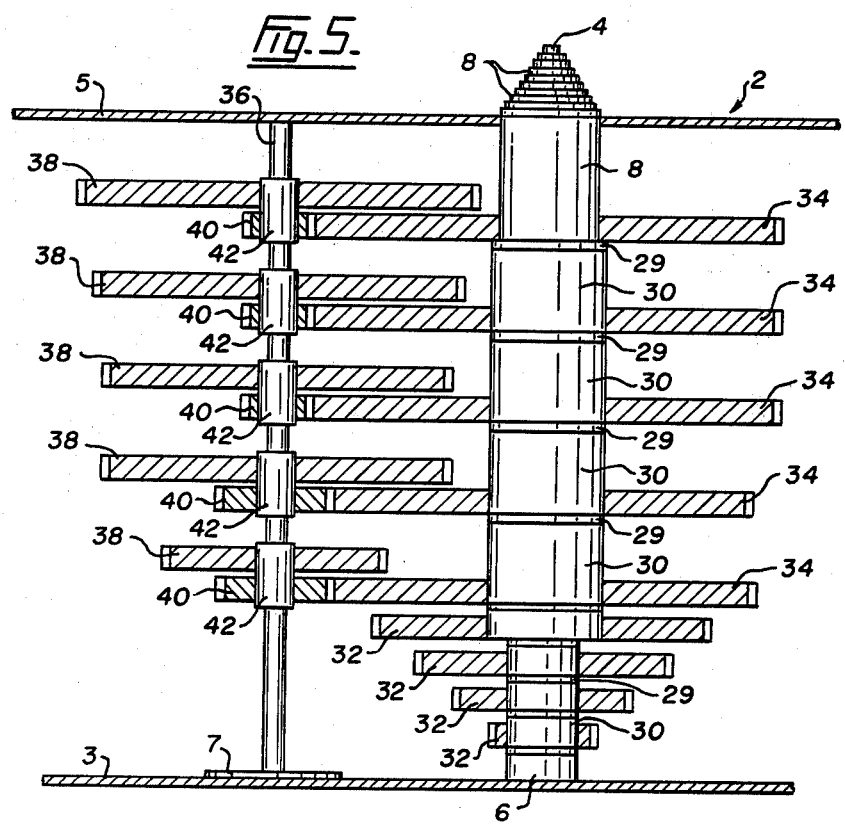

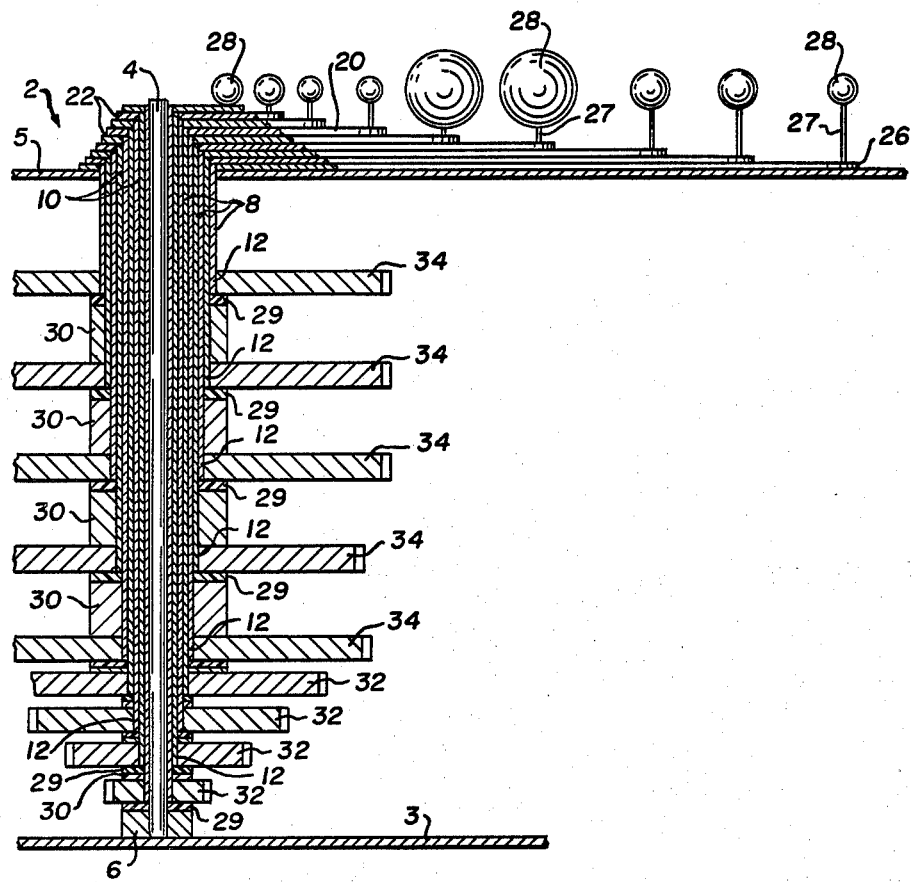
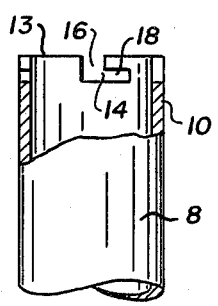
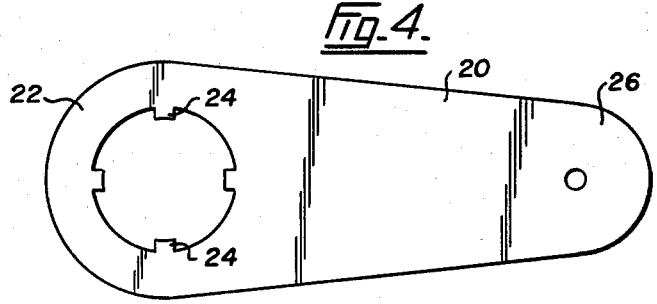

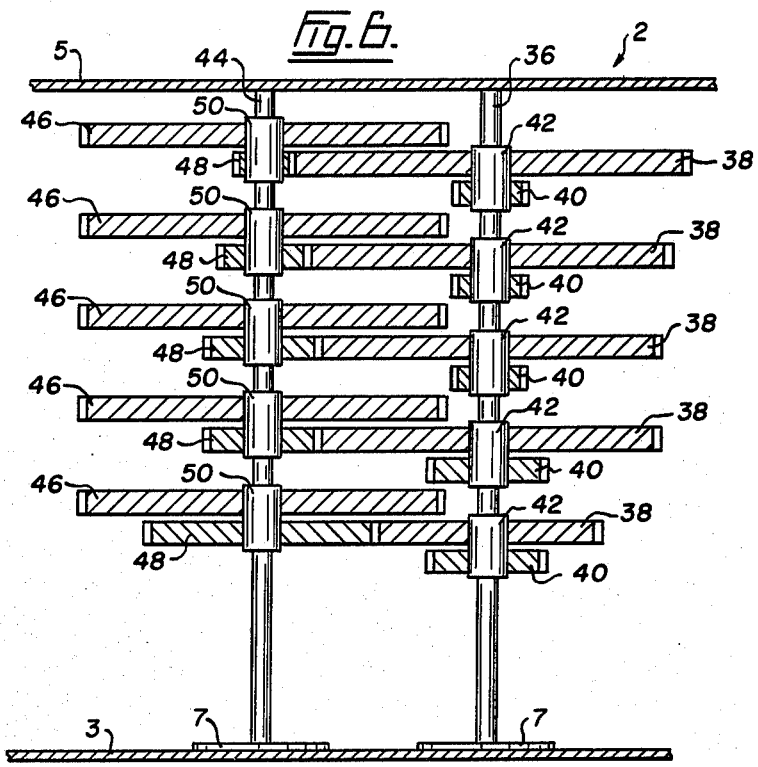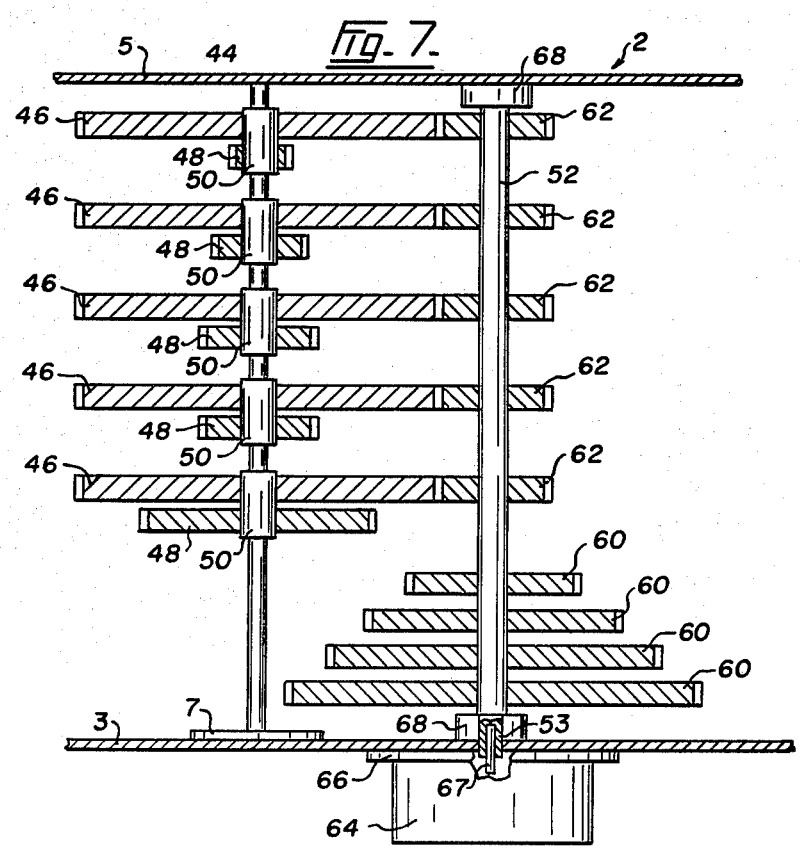

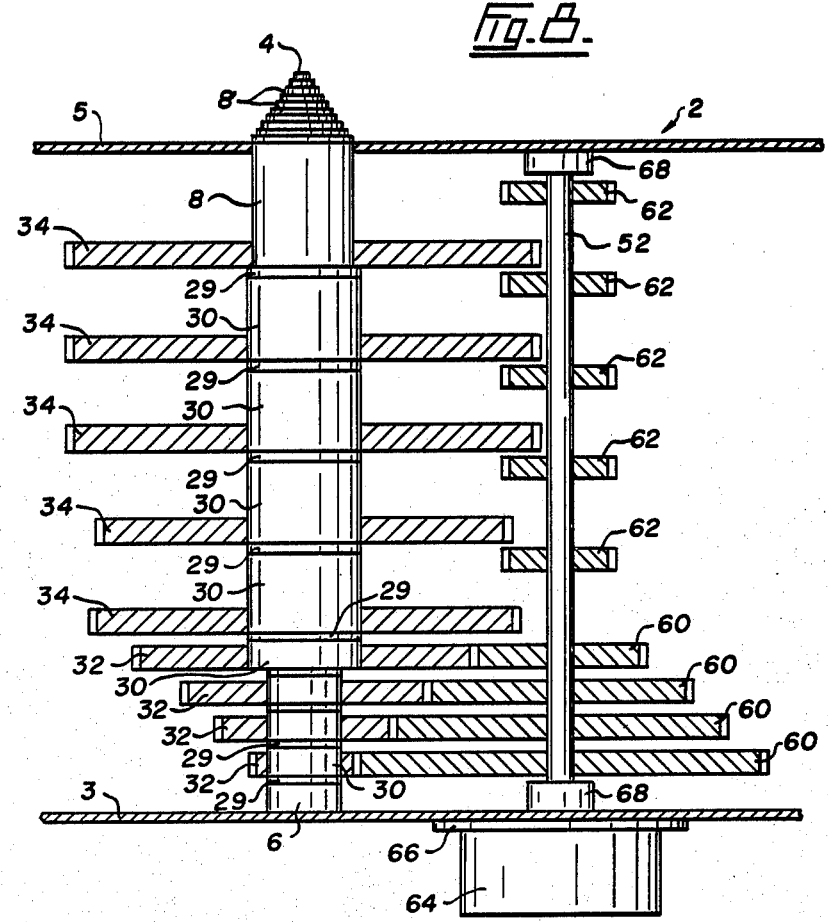

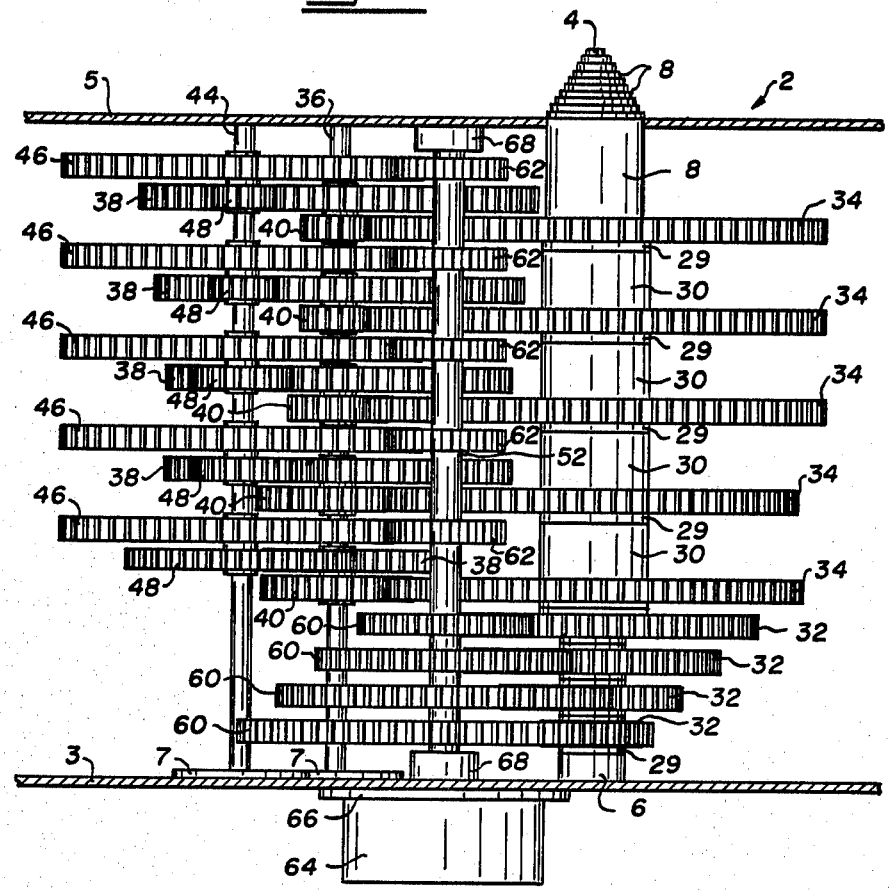

ORRERY

FIELD OF THE INVENTION

This invention relates to an orrery for displaying planetary bodies.

BACKGROUND OF THE INVENTION

Orreries for displaying planetary bodies such as planets of the solar system or their moons, are well known. Such orreries typically consist of planetary body representations mounted on the end of an arm, the opposite end of the arm being either rotatably mounted on a shaft or fixedly mounted to a shaft which itself can be rotated. Generally, the latter method is used and when a plurality of planetary body representations are to be displayed, the shafts are mounted, concentrically. These shafts are then driven usually through gear trains from a single drive source such as a hand crank or electric motor. Often it is desirable to rotate the planetary body representations at their correct relative rotational velocities which for orreries of the latter type resulted in relatively complex gear trains. These gear trains when combined with the remainder of the orrery mechanism, often produced an orrery which was bulky and mechanically complex and which was not readily capable of assembly and disassembly when desired.

SUMMARY OF THE INVENTION

The present invention provides an orrery which comprises a frame, and a plurality of concentric hollow tubes rotatably mounted on the frame. Each of the tubes have first and second ends, the first and second ends of each of them extending axially beyond first and second ends respectively of its outwardly adjacent tube. A plurality of supports are also provided, which are connected at inner ends of them to the first end of respective tubes. The supports extend radially outward from the tubes a distance increasing from the support connected to the innermost of the tubes, to the support connected to the outermost of the tubes. A plurality of planetary representations, representing a plurality of inner planets and a plurality of outer plants are connected to respective supports remote from the tubes, so as to be rotated about the tubes when the tubes are rotated. A first set of circular gears are connected to the second end of respective ones of the tubes which rotate planetary representations of inner planets. A second set of circular gears is also provided, the gears of which are connected to the second end of respective ones of the tubes which rotate planetary representations of outer planets. First and second spaced apart axles are also mounted on the frame parallel to the tubes. Third and fourth sets of circular gears are rotatably mounted on the first axle, each gear of the third set being adjacent and connected to a corresponding gear of the fourth set so as to rotate the latter when the former is rotated. Each gear of the fourth set engages a corresponding gear of the second set of gears. Fifth and sixth sets of circular gears are rotatably mounted on the second axle, each gear of the fifth set being adjacent and connected to a corresponding one of the sixth set of gears so as to rotate the latter when the former is rotated. Each gear of the sixth set engages a corresponding one of the third set of gears. A third axle is also provided and is rotatably mounted on the frame parallel to the tubes. Seventh and eighth sets of circular gears are mounted on the third axle to rotate with it. Each gear of the seventh set of gears engages a corresponding one of the first set of gears, and each gear of the eighth set engages a corresponding one of the fifth set of gears. A means is provided which is connected to the third axle, for rotating that axle. The gears in the sets of gears described are dimensioned so as to rotate the tubes at relative rotational velocities corresponding to the relative rotational velocities of the planets represented by the planetary representations.

Advantageously, the inner planets are those of the solar system inward of Jupiter and the outer planets are those of the solar system outward of Mars.

Preferably, the first, second, and third axles and the tubes, have their axes laterally disposed substantially at the corners of a square.

Advantageously, the supports are removably connected to the tubes. Usefully, nine tubes and nine planetary representations are provided.

DRAWINGS

An embodiment of the invention will now be described in more detail with reference to the drawings, in which:

FIG. 1 is a top plan view of an orrery of the present invention;

FIG. 2 is a partly cross-sectional view along line 2—2 of FIG. 1;

FIG. 3 is a partly sectional view of the first end of one of the tubes;

FIG. 4 is a horizontal plan view of one of the supports;

FIG. 5 is a partly cross-sectional view along line 5—5 of FIG. 1;

FIG. 6 is a partly cross-sectional view along line 6—6 of FIG. 1;

FIG. 7 is a partly cross-sectional view along line 7—7 of FIG. 1;

FIG. 8 is a partly cross-sectional view along line 8—8 of FIG. 1; and

FIG. 9 is a cross-sectional view along line 9—9 of FIG. 1.

DESCRIPTION OF THE PREFERRED EMBODIMENTS

One embodiment of the orrery of this invention will now be described with reference to the drawings.

The orrery comprises a frame 2 on which is rotatably mounted a plurality of concentric hollow tubes 8. The tubes 8 are rotatably mounted on the frame 2 by positioning the innermost of said tubes 8 on the stationary axle 4 which has a base 6 secured to the frame 2. Each of the tubes 8 has a first end 10 and a second end 12. A plurality of arms 20 act as support means, each of the arms 20 having an inner end 22. Each of the arms 20 is connected at the inner end 22 to the first end 10 of one of the tubes 8 so as to extend radially outward from the first end of the tube 8 to which it is connected as is shown in FIG. 1.

The first end 10 of each of the tubes 8 has four slots 14 disposed on it. Each of the slots 14 has a first portion 16 which axially extends from the first end edge 13 of the tube 8, and a second portion 18 which circumferentially expands from an end of the first portion 16 which is remote from the first end edge 13 of the tube 8. As well, the inner end 22 of each of the supports 20 has four radially inwardly extending grips 24 as is most clearly shown in FIG. 3. Each of the grips 24 is adapted to be received and removably retained in the slots 14 of the tube 8 to which the support 20 is to be connected. FIG. 1 of course, shows each of the supports 20 connected to the first end 10 of one of the tubes 8 so as to extend radially outwardly therefrom. The planetary body representations 28 of planets of the solar system are each connected through rods 27 to an end 26 of one of the supports 20 which represents a position on the support 20 remote from the tube 8 to which the support 20 is connected.

A first set of circular gears 32 is connected to a second end 12 of each of the tubes 8 which is connected to a planetary representation 28 of a planet inward of Jupiter. Of course, the tubes 8 may be referred to as being connected to planetary representations 28 although such a connection is indirect through supports 20 and rods 27. A second set of circular gears 34 is connected to the second end 12 of each of the tubes 8 which is connected to a planetary representation 28 of a planet outward of Mars. In order to prevent the weight of the tubes 8, the supports 20, the planetary representations 28 and the first and second sets of gears 32 and 34 respectively from causing undue friction between the supports 20, a spacer 30 is attached to the upper surface of each of the first set of gears 32 and the second set of gears 34. Each of the spacers 30 and the base 6 bear against a low frictional surface 29 attached to the lower side of each gear in the first set of gears 32 and the second set of gears 34. Such a low frictional surface 29 can be made from nylon, teflon, or any other material having a low frictional coefficient.

A first axle 36, a second axle 44, and a third axle 52 are mounted on the frame 2 parallel to the tubes 8 with the axes of the tubes 8 and each of the axles being laterally disposed substantially at the corners of a square as is most clearly apparent from FIG. 8. The first axle 36 and the second axle 44, are each fixedly attached at either end to the frame 2. Each of the third set of circular gears 38 and the fourth set of circular gears 40 are rotatably mounted on the first axle 36 by being connected to a bearing 42 which is in turn connected to the first axle 36. Each bearing 42 has connected to it one gear of each of the third set of gears 38 and one gear of each of the fourth set of gears 40 so that as a result, each gear of the third set 38 is connected to a gear of the fourth set 40 so as to rotate the gear of the fourth set 40 when the gear of the third set 38 is rotated. Each gear of the fourth set of gears 40 engages corresponding a gear of the second set of gears 34.

The second axle 44 has mounted on it a fifth set of circular gears 46 and a sixth set of circular gears 48. Each one of the gears of the fifth set 46 corresponding and each one of the gears of the sixth set 48 are each mounted on a common bearing 50 so as to be rotatably mounted on the second axle 44 and so that each gear of the fifth set 46 is connected to a gear of the sixth set 48 so as to rotate the gear of the sixth set 48 when the gear of the fifth set 46 is rotated. Each of the gears of the sixth set 48 engages corresponding a gear of the third set 38 on the first axle 36.

The third axle 52 is rotatably mounted on the frame 2 at either end by means of bearings 68. A seventh set of circular gears 60 and an eighth set of circular gears 62 are directly mounted on the third axle 52 so as to rotate with it. Each of the seventh set of circular gears 60 engages corresponding one of the second set of gears 32 while each of the eighth set of gears 62 engages corresponding one of the fifth set of gears 46.

A motor 64 is mounted by means of its face plate 66 on the lower end 3 of the frame 2. The shaft 67 of the motor 64 is connected to the third axle 52 so as to rotate the third axle 52 by means of splines on the shaft 67 (not shown) which can mate with corresponding splines (also not shown) in a recess portion at the bottom end 53 of the third axle 52. The motor 64 serves as the means for rotating the third axle 52. All of the sets of gears, the first, second, and third axles, and the motor 64, serve as the drive means which is connected to the second end 12 of each of the tubes 8 for rotating each of the tubes 8.

The grips 24 on the inner end 22 of the supports 20 and the slots 14 disposed at the first end 10 of each of the tubes 8, together serve as the bayonet plug and socket means which removably connects the inner end 22 of each of the supports 20 to the first end 10 of one of the tubes 8 so as to cause each of the supports 10 to rotate when the tube 8 to which it is attached rotates. A rectangular box may conveniently serve as the frame 2 of the orrery. Each of the gears in the first through seventh set of gears are dimensioned so as to rotate the tubes 8 at relative rotational velocities corresponding to the relative rotational speeds of the planets of the solar system represented by the planetary representations 28.

When the motor 64 is activated it will rotate the third axle 52 and the connected sixth set of gears 60 and eighth set of gears 62. The seventh set of gears 60 will rotate the first set of gears 32 and the tubes 8 to which the first set of gears 32 are connected, thereby rotating the planetary representations 28 which represent planets inward of Jupiter. The eighth set of gears 62 acting through the third through fifth sets of gears inclusive, will rotate the second set of gears 34 and the tubes 8 to which they are connected, thereby rotating the planetary representations 28 representing planets outward of Mars.

Once the correct gear ratios have been determined so as to roate the tubes 8 at relative rotational velocities corresponding to the relative rotational speeds of the planets represented by the planetary representations 28, the orrery may be readily constructed by various sizes and from a variety of materials. Those gears which are connected directly to the tubes 8 or to the third axle 52, may be connected by press fitting or by another known means, the only restriction being that the connection must be sufficiently strong to retain the gears in position on the tubes 8 or the third axle 52. During construction of the orrery, the first axle 36 and the second axle 44 may each be conveniently connected at a lower end to a base plate 7 by any known means such as welding. Each of the base plates 7 may then be attached by screws (not shown) or other means to the lower end 3 of the housing 2. The base 6 with its attached shaft 4 may also be affixed to the bottom end 3 of the frame 2 in a similar manner. The tubes 8 with the attached first set of gears 32 and a second set of gears 34, and spacers 30 and low friction surfaces 29 can then be installed about the shaft 4. The third axle 52 can then have its lower end 53 installed in the bearing 68 over the splined shaft 67. Following this, the top end 5 of the housing 2 may be fastened to the remainder of the housing so that the top end of the first axle 36, second axle 44, and the tubes 8 pass through the holes in the top end 5 of the frame 2. At the same time, the top end of the third axle 52 is seated in the bearing 68 previously installed in the top end 5 of the frame 2. Each of the supports 20 may then be installed on the first end 10 of the tubes 8 through the grips 24 and the slots 14. When the orrery is to be transported, the supports 20 which form the bulkiest part of the orrery, can be conveniently detached from the first end 10 of the tubes 8. As well, should it be desired, the orrery can be readily disassembled further by simply reversing the assembly process described.

Various modifications to the orrery of the present invention are possible. For example, if desired the bayonnet plug and socket means could alternatively comprise slots formed in the inner end 22 of the supports 20 providing the supports 20 are sufficiently thick. In such a situation, outwardly protruding grips could then be attached to the first end 10 of the tubes 8 which would be adapted to be received and removably retained in the slots in the supports 20. For ease of manufacture however, the bayonnet plug and socket means described previously is preferred. As well, the supports 20, could be circular rather than having an elongated shape as do the supports 20 shown in the drawings. Such a circular shape would be preferred in a case where the supports 20 were constructed of very thin material which was not sufficiently rigid so that the outer ends 26 of two or more supports 20 could lock against each other. The orrery of the present invention can also be adapted to display planetary representations representing planets of other solar systems or of moons of a particular planet of the solar system, and it will be understood that the word "planets" encompass such a possibility provided that such other systems have relative rotational velocities of the planets or moons which will utilize gear ratios of the various sets such that the compact arrangement of the drive means described above will not be lost.

Other various modifications, and departures lying within the spirit of the invention or its scope as defined by the appended claims will be obvious to those skilled in the art.

I claim:

1. An orrery comprising:
   (a) a frame;
   (b) a plurality of concentric hollow tubes rotatably mounted on said frame, each having first and second ends, the first and second ends of each of said tubes extending axially beyond first and second ends respectively of its outwardly adjacent tube;
   (c) a plurality of supports connected at inner ends thereof to the first end of respective tubes, so as to extend radially outward therefrom a distance increasing from said support connected to the innermost of said tubes to said support connected to the outermost of said tubes;
   (d) a plurality of planetary representations representing a plurality of inner planets and a plurality of outer planets connected to respective supports remote from said tubes so as to be rotated about said tubes when said tubes are rotated;
   (e) first set of circular gears connected to the second end of respective ones of said tubes which rotate planetary representations of inner planets;
   (f) a second set of circular gears connected to the second end of respective ones of said tubes which rotate planetary representations of outer planets;
   (g) first and second spaced apart axles mounted on said frame parallel to said tubes;
   (h) third and fourth sets of circular gears rotatably mounted on said first axle, each gear of said third set being adjacent and connected to a corresponding gear of the fourth set so as to rotate the latter when the former is rotated, and each gear of the fourth set engaging a corresponding gear of the second set of gears;
   (i) fifth and sixth sets of circular gears rotatably mounted on said second axle, each gear of said fifth set being adjacent and connected to a corresponding one of the sixth set of gears so as to rotate the latter when the former is rotated, and each gear of the sixth set engaging a corresponding one of said third set of gears;
   (j) a third axle rotatably mounted on said frame parallel to said tubes;
   (k) seventh and eighth sets of circular gears mounted on said third axle to rotate therewith, each gear of said seventh set of gears engaging a corresponding one of said first set of gears, and each gear of said eighth set of gears engaging a corresponding one of said fifth set of gears;
   (l) means connected to said third axle for rotating said third axle;

each gear in said sets of gears being dimensioned so as to rotate said tubes at relative rotational velocities corresponding to the relative rotational velocities of the planets represented by the planetary representations.

2. An orrery as described in claim 1 wherein said first, second and third axles and said tubes, have their axes laterally, disposed substantially at the corners of a square.

3. An orrery as described in claim 2 wherein the inner planets are those of the solar system inward of Jupiter and the outer planets are those of the solar system outward of Mars.

4. An orrery as described in claim 3 wherein said supports are removably connected to said tubes.

5. An orrery as described in claim 1 wherein nine tubes and nine planetary representations are provided.

6. An orrery as described in claim 2 wherein none tubes and nine planetary representations are provided.

7. An orrery as described in claim 3 wherein nine tubes and nine planetary representations are provided.

* * * * *